US012147298B2

(12) United States Patent
Kosugi et al.

(10) Patent No.: US 12,147,298 B2
(45) Date of Patent: Nov. 19, 2024

(54) NETWORK MANAGEMENT FOR AUTOMATIC RECOVERY IN THE EVENT OF A FAILURE

(71) Applicant: RAKUTEN MOBILE, INC., Tokyo (JP)

(72) Inventors: Masaaki Kosugi, Tokyo (JP); Jun Okada, Tokyo (JP); Go Urasawa, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/910,458

(22) PCT Filed: May 23, 2022

(86) PCT No.: PCT/JP2022/021061
§ 371 (c)(1),
(2) Date: Sep. 9, 2022

(87) PCT Pub. No.: WO2023/228233
PCT Pub. Date: Nov. 30, 2023

(65) Prior Publication Data
US 2024/0202064 A1 Jun. 20, 2024

(51) Int. Cl.
*G06F 11/00* (2006.01)
*G06F 9/455* (2018.01)
(Continued)

(52) U.S. Cl.
CPC ...... *G06F 11/0793* (2013.01); *G06F 9/45558* (2013.01); *G06F 11/0712* (2013.01); *G06F 11/1415* (2013.01); *G06F 2009/45562* (2013.01)

(58) Field of Classification Search
CPC ............ G06F 11/0793; G06F 11/0712; G06F 11/1415; G06F 11/079; G06F 11/301; G06F 9/45558; G06F 2009/45562
See application file for complete search history.

(56) References Cited

U.S. PATENT DOCUMENTS 9,367,379 B1* 6/2016 Burke ................. G06F 11/0793
10,133,619 B1* 11/2018 Nagpal ................. G06F 11/079
(Continued)

FOREIGN PATENT DOCUMENTS

| JP | 2016-533655 A | 10/2016 |
| JP | 2018-026709 A | 2/2018 |
| WO | 2016/121802 A1 | 8/2016 |

*Primary Examiner* — Joseph D Manoskey
(74) *Attorney, Agent, or Firm* — Sughrue Mion, PLLC

(57) ABSTRACT

A network management device executes acquisition processing, determination processing, and implementation processing. The acquisition processing is for acquiring notification information that is issued in response to a failure occurring in a physical server or a virtual machine constructed in the physical server in a network virtual environment. The determination processing is for determining, in a case where the notification information is acquired, whether or not healing processing for recreating the virtual machine in which the failure has occurred needs to be implemented, based on information related to the failure. The implementation processing is for automatically implementing the healing processing in a case where it is determined that the healing processing needs to be implemented.

10 Claims, 6 Drawing Sheets

(51) Int. Cl.
   *G06F 11/07*     (2006.01)
   *G06F 11/14*     (2006.01)

(56) References Cited

U.S. PATENT DOCUMENTS

| | | | |
|---|---|---|---|
| 10,560,309 B1* | 2/2020 | Chitalia | H04L 41/40 |
| 2009/0144579 A1* | 6/2009 | Swanson | G06F 11/0712 |
| | | | 718/1 |
| 2016/0224409 A1 | 8/2016 | Liu et al. | |
| 2017/0315859 A1* | 11/2017 | Marshall | G06F 11/0772 |
| 2018/0024852 A1 | 1/2018 | Yabushita et al. | |
| 2020/0081788 A1* | 3/2020 | Kataki | G06F 11/0712 |
| 2021/0042197 A1* | 2/2021 | Rivera | G06F 9/45558 |

* cited by examiner

| LIST ID | FAILURE INFORMATION | CHECK INFORMATION | VALUE |
|---|---|---|---|
| 000001 | No response | SEL | Reboot event |
| 000002 | FPGA fatal bus error | SEL | Reboot event |
| ⋮ | ⋮ | ⋮ | ⋮ |
| ⋮ | ⋮ | ⋮ | ⋮ |

NETWORK MANAGEMENT FOR AUTOMATIC RECOVERY IN THE EVENT OF A FAILURE

CROSS REFERENCE TO RELATED APPLICATIONS

This application is a National Stage of International Application No. PCT/JP2022/021061 filed May 23, 2022.

TECHNICAL FIELD

The present disclosure relates to network management for automatic recovery in case of a failure.

BACKGROUND ART

Against a backdrop of improved performance of general-purpose servers and enhanced network infrastructure the on-demand use of computing resources virtualized on physical resources such as servers, the so-called cloud computing (hereinafter referred to as the "cloud") has become widespread. Also, the technology of NFV (Network Function Virtualization), namely one that provides virtualized network functions on the cloud, has become well known. NFV is a technology that separates hardware and software of various network services that used to run on dedicated hardware, and runs the software on a virtualized infrastructure by means of virtualization and cloud technologies. This is expected to improve the sophistication of operations and reduce costs.

Furthermore, virtualization has also been promoted in mobile networks in recent years.

ETSI (European Telecommunications Standards Institute) NFV defines the NFV architecture (e.g., see Patent Literature Document 1).

LISTING OF REFERENCES

Patent Literature Documents

Patent Literature Document 1: WO 2016/121802

SUMMARY OF THE INVENTION

Problems to be Solved by the Invention

Conventionally, if a hardware failure or a virtual machine failure has occurred in a virtual environment, OSS and MANO will work together to implement healing processing to recreate the virtual machine on normal hardware. This healing processing is automatically implemented by a trigger, which is a failure notification from the server where the failure occurred or a management node that monitors and manages this server.

However, depending on the content or the like of the failure, the server and the virtual machine may implement automatic recovery without going through the healing processing.

In a configuration in which the healing processing is automatically triggered by a failure notification, the healing processing is implemented even for servers and virtual machines that can be automatically recovered as mentioned above. In such cases, human operations as post-processing, such as problem analysis for the failed server or virtual machine, replacement of the failed server, and migration of the virtual machine back to the normal server after the replacement, may be carried out while these being unnecessary.

An objective of the present disclosure is a reduction of operation costs in case of a failure in a virtual environment.

Solution to the Problems

To solve the above-stated problem, a network management device according to one aspect of the present disclosure includes one or more processors, and at least one of the one or more processors executing acquisition processing, determination processing, and implementation processing. The acquiring processing is for acquiring notification information that is issued in response to a failure occurring in a physical server or a virtual machine constructed in the physical server in a network virtual environment. The determination processing is for determining, in a case where the notification information is acquired, whether or not healing processing for recreating the virtual machine in which the failure has occurred needs to be implemented, based on information related to the failure. The implementation processing is for automatically implementing the healing processing in a case where it is determined that the healing processing needs to be implemented.

To solve the above-stated problem, a network management method according to one aspect of the present disclosure includes: acquiring notification information that is issued in response to a failure occurring in a physical server or a virtual machine constructed in the physical server in a network virtual environment; determining, in a case where the notification information is acquired, whether or not healing processing of recreating the virtual machine in which the failure has occurred needs to be implemented, based on information related to the failure; and automatically implementing the healing processing in a case where it is determined that the healing processing needs to be implemented.

To solve the above-stated problem, a network management system according to one aspect of the present disclosure includes one or more processors, and at least one of the one or more processors executing acquisition processing, determination processing, and implementation processing. The acquiring processing is for acquiring notification information that is issued in response to a failure occurring in a physical server or a virtual machine constructed in the physical server in a network virtual environment. The determination processing is for determining, in a case where the notification information is acquired, whether or not healing processing for recreating the virtual machine in which the failure has occurred needs to be implemented, based on information related to the failure. The implementation processing is for automatically implementing the healing processing in a case where it is determined that the healing processing needs to be implemented.

Advantageous Effects of the Invention

According to one aspect of the present disclosure, operational costs can be reduced in case of a failure in a virtual environment.

DESCRIPTION OF EMBODIMENTS

Figure 1:
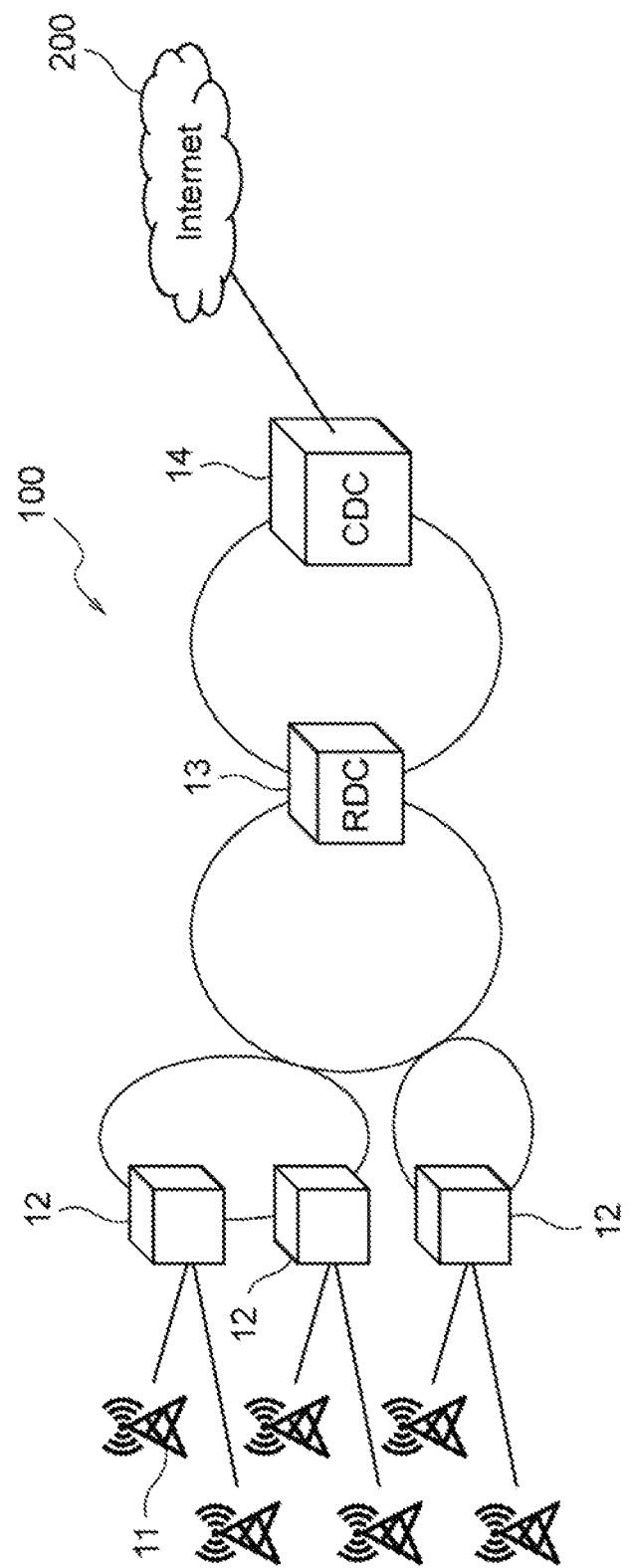
FIG. 1 shows an example of a configuration of a mobile network that includes a network management device according to an embodiment.

Hereinafter, an embodiment of the present disclosure will be described in detail with reference to the accompanying drawings. Constituent elements disclosed below that have the same function are assigned the same reference numeral, and a repeated description thereof is omitted. Note that the embodiment disclosed below is one mode of the present disclosure and may be appropriately modified or changed depending on the device configuration and various conditions. There is no limitation to the following embodiment. Not all combinations of features described in the embodiment are necessarily essential for the above means for solving the problem.

The following is a description of the case where a network management device according to the present embodiment has a network management function for automatic recovery in case of a failure in a mobile network constructed on a virtualization infrastructure.

Specifically, if a failure has occurred in a physical server or a virtual machine constructed on the physical server in a network virtual environment, the network management device determines whether or not healing processing (hereinafter referred to as "autohealing") for recreating the virtual machine in which the failure has occurred needs to be implemented. If it is determined that autohealing needs to be implemented, the network management device implements autohealing.

The network management device in the present embodiment acquires notification information (hereinafter referred to as an "alert") that is issued when the failure has occurred, and determines, if the alert is acquired, whether or not autohealing needs to be implemented based on information related to the failure. Here, the information related to the failure may be the acquired alert, or may be information other than the acquired alert. The information related to the failure may be state information that indicates the state of the physical server on which the virtual machine in which the failure has occurred is constructed, for example. The state information regarding the physical server may be a system event log (SEL), for example.

FIG. 1 shows an example of the network configuration of a mobile network 100, which includes the network management device of the present embodiment.

In the mobile network 100 shown in FIG. 1, terminals capable of mobile communication, such as smartphones, wirelessly communicate with a radio access network (RAN), and can connect to the Internet 200 or other companies' networks to make voice calls by sending wirelessly communicated information to a core network via a backhaul network (mobile backhaul: MBH) and processing the information.

Specifically, the mobile network 100 includes a base station 11 and a plurality of exchange stations 12 to 14. Here, the exchange stations 12 are edge data centers, the exchange station 13 is a regional data center (RDC), and the exchange station 14 is a central data center (CDC). A backhaul network is configured between the edge data centers 12 and the central data center 14.

The mobile network 100 in the present embodiment may be a virtualized network constructed on a virtualization infrastructure. This mobile network 100 realizes, on general-purpose servers, functions ranging from exchangers of a trunk network to the wireless access function of the base station, by means of software.

The base station 11 includes an antenna, a switchboard, a battery, and so on.

The edge data centers 12 are installed near the base station 11 and connected to a plurality of base stations 11 by optical fiber cables or the like. The edge data centers 12 realize RAN-related wireless access functions.

The regional data center 13 is connected to a plurality of edge data centers 12 arranged in a target region. This regional data center 13 realizes by means of software various applications such as for a firewall/network address translation (NAT), a content distribution network (CDN), and edge computing.

The central data center 14 is connected to a plurality of regional data centers 13. The central data center 14 realizes core functions such as Evolved Packet Core (EPC) and IP Multimedia Subsystem (IMS).

Note that the numbers of data centers (exchange stations) such as edge data centers 12, regional data centers 13, and central data centers 14 are not limited to those shown in FIG. 1. For example, although FIG. 1 only shows one regional data center 13 and one central data center 14, a plurality of regional data centers 13 and a plurality of central data centers 14 may be installed.

Figure 2:
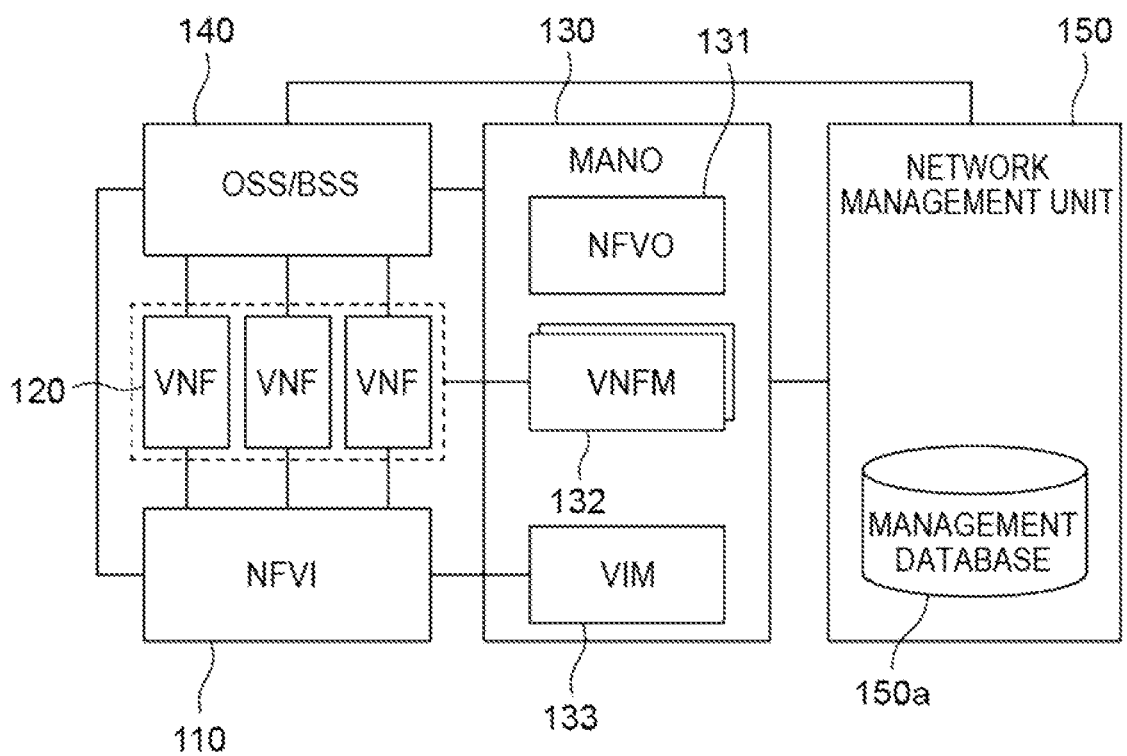
FIG. 2 shows an example of an internal configuration of a network management system.

FIG. 2 shows an example of the internal configuration of a network management system that constitutes the mobile network 100.

Each constituent element shown in FIG. 2 has a reference point. Lines connecting the constituent elements shown in FIG. 2 indicate that information can be transmitted and received therebetween.

An NFV Infrastructure (NFVI) 110 is a network function virtualization infrastructure, and includes physical resources, a virtualization layer, and virtualized resources. The physical resources include hardware resources such as computational resources, storage resources, and transmission resources. The virtualization layer refers to a virtualization layer such as a hypervisor for virtualizing physical resources and providing the virtualized resources to VNFs (Virtual Network Function) 120. The virtualized resources are infrastructure resources that are virtualized and provided to the VNFs 120.

Specifically, the NFVI 110 is an infrastructure that enables hardware resources of physical servers (hereinafter simply referred to as a "server") with such functions as computing, storage and network, to be flexibly handled as virtualized hardware resources with such functions as virtualized computing, virtualized storage, and a virtualized network that are virtualized by the virtualization layer such as a hypervisor.

A plurality of servers that constitute the NFVI 110 are collectively arranged in the data centers (exchange stations) 12 to 14. The number, arrangement positions, wiring, and the like, of the servers arranged in the data centers 12 to 14 are predetermined depending on the type (exchange station type) of data center. The servers arranged in each of the data centers 12 to 14 are connected by an internal network so that information can be transmitted and received therebetween.

The data centers are connected by a network. Servers provided in different data centers can transmit and receive information to and from each other via this network.

The VNFs 120 correspond to applications that run on virtual machines (VMs) on the servers, and realize network functions with software. Note that, although not specifically shown in the diagrams, a management function called Element Manager (EM) may also be provided for each VNF 120.

The NFVI 110 and the VNFs 120 in FIG. 2 constitute a virtual environment. That is to say, the virtual environment is constituted by three layers, namely hardware, the virtualization layer, and the virtual machines, from the bottom up.

A management and orchestration (MANO) 130 has management and orchestration functions for the virtual environment. The MANO 130 includes an NFV-orchestrator (NFVO) 131, VNF-managers (VNFMs) 132, and a virtualized infrastructure manager (VIM) 133.

The NFVO 131 orchestrates the NFVI resources and manages the lifecycle of network services, thus integrally managing the operation of the entire system. This NFVO 131 is capable of performing processing in response to instructions from a later-described operation support system/business support system (OSS/BSS) 140.

The VNFM 132 manages the lifecycle of the VNFs 120. Note that the VNFMs 132 may alternatively be arranged in the MANO 130 as VNFMs dedicated to corresponding VNFs 120. Alternatively, one VNFM 132 may manage the lifecycle of two or more VNFs 120. In this case, the VNFMs 132 may be general-purpose VNFMs corresponding to VNFs 120 provided by different vendors.

The VIM 133 manages the operation of the resources used by the VNFs 120.

The OSS/BSS 140 is an integrated management system for the mobile network 100.

Here, the OSS is a system (device, software, mechanism etc.) necessary for constructing and operating services. The BSS is an information system (device, software, mechanism etc.) used for charging of usage fees, billing, customer support, or the like.

A network management unit 150 realizes a network management function of determining whether or not autohealing needs to be implemented when a failure has occurred in a physical server that is a part of the NFVI or in a virtual machine (VNF), and automatically performing autohealing if it is determined that autohealing needs to be implemented. This network management unit 150 constitutes the network management device according to the present embodiment.

The network management unit 150 can include a management database 150*a* for managing autohealing implementation conditions. If the network management unit 150 acquires an alert that is issued in case of a failure, the network management unit 150 can execute implementation determination processing for determining whether or not autohealing needs to be implemented, using information included in the alert and information managed by the management database 150*a*. If it is determined that autohealing needs to be implemented, the network management unit 150 gives the OSS/BSS 140 and the MANO 130 an instruction to implement autohealing.

The management database 150*a* manages data that describes autohealing implementation conditions in a list format. The implementation condition list managed by the management database 150*a* can be data that associates possible failures with check information and values.

Here, the check information is information related to each failure, and is information that needs to be checked in addition to the alert in order to determine whether or not autohealing needs to be implemented when the failure has occurred. The check information may include the aforementioned state information regarding a physical server, for example.

The aforementioned values are values that may be included in the check information, and are related to the autohealing implementation conditions. These values may be specific keywords that may be included in the check information. For example, the network management unit 150 can determine that autohealing does not need to be implemented if the check information includes a specific keyword. The details of the implementation condition list will be described later.

Note that the management database 150*a* may be a volatile memory, a nonvolatile memory, or the like that acquires the aforementioned implementation condition list from an external device and temporarily stores it. In this case, there is no specific limitation on the timing of acquiring the implementation condition list.

Furthermore, the network management unit 150 is not limited to being a function external to the OSS/BSS 140 and the MANO 130 as shown in FIG. 2. The network management unit 150 may alternatively be provided within the OSS/BSS 140, or may be provided within the MANO 130. In this case, the network management function of the network management unit 150 is a function of the OSS/BSS 140 or the MANO 130.

If the network management unit 150 is provided within the OSS/BSS 140 or the MANO 130, the network management unit 150 may implement autohealing, instead of giving an instruction to implement autohealing, if it is determined through the implementation determination processing that autohealing needs to be implemented.

Figures 3, 4:
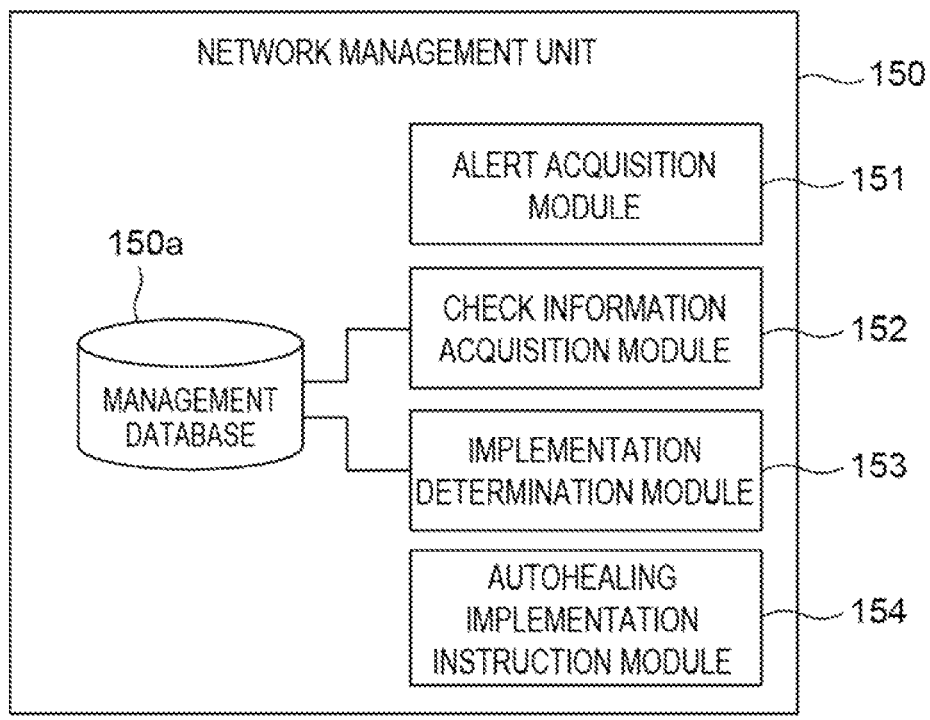
FIG. 3 is a functional block diagram of a network management unit.
FIG. 4 is a sequence diagram showing an autohealing operation.

FIG. 3 is a functional block diagram of the network management unit 150.

As shown in FIG. 3, the network management unit 150 includes an alert acquisition module 151, a check information acquisition module 152, an implementation determination module 153, and an autohealing implementation instruction module 154.

The alert acquisition module 151 acquires an alert that is issued when a failure has occurred in a physical server or a virtual machine. When a failure has occurred in a physical server or a virtual machine, an alert is issued from the NFVI 110 or any of the VNFs 120. The alert acquisition module 151 can acquire the alert issued from the NFVI 110 or any of the VNFs 120 via the OSS/BSS 140 or the MANO 130.

The check information acquisition module 152 looks up in the management database 150*a* based on the alert acquired by the alert acquisition module 151 and determines check information that should to be referred to. The check information acquisition module 152 then acquires the determined check information.

The implementation determination module 153 determines whether or not autohealing needs to be implemented, based on at least either the alert acquired by the alert acquisition module 151 or the check information acquired by the check information acquisition module 152.

FIG. 4 shows an example of an autohealing implementation condition list 400 managed by the management database 150*a*.

The implementation condition list 400 stores list IDs, failure information, check information, and corresponding values.

The list ID is identification information in the list and may be determined as needed.

The failure information is information that may be included in the alert, and can be information indicating the content of the failure. As shown in FIG. 4, the failure information may include "No response", "FPGA fatal bus error", or the like.

For example, if an error in the operating system OS such as a kernel panic, a network failure, or the like has occurred, where a timeout error is taking place and no response is received upon a request, the alert may include "No response" as failure information.

Also, for example, if an error has occurred while data is being transferred between an FPGA (Field Programmable Gate Array) and a host, the alert may include "FPGA fatal bus error" as failure information.

The check information is information that should be checked in order to determine whether or not autohealing needs to be implemented when a failure has occurred, and may be a system event log (SEL) as shown in FIG. 4. An SEL is a log that describes system events, and is state information indicating the state of a server that is generated for each server. If, for example, a server rebooted, "Reboot event" is logged in the SEL. Note that event IDs are also logged in the SEL in some cases. In this case, the management database 150a may also manage the event ID in correspondence with each "Reboot event".

In the present embodiment, the implementation determination module 153 determines that autohealing needs to be implemented if the check information does not include any of the values managed in the implementation condition list 400. In other words, the implementation determination module 153 determines that autohealing does not need to be implemented if the check information includes a value managed in the implementation condition list 400.

There are cases where the server and the virtual machine can be automatically be recovered merely by rebooting without implementing healing processing, depending on the content of the failure. For example, when a kernel panic has occurred, the server can be recovered by rebooting. Also, the server is highly likely to be recovered by rebooting if, during data transfer, an error in data writing or the like has occurred due to the communication timing. In addition, in virtualized environments, servers are often set to automatically reboot if such failure has occurred as a server can be automatically recovered by rebooting as described above.

For this reason, the implementation determination module 153 determines that autohealing does not need to be implemented if it is confirmed that the server in which the failure has occurred rebooted after the failure occurred.

If, for example, the alert acquired by the alert acquisition module 151 includes "No response", the check information acquisition module 152 looks up in the implementation condition list 400 shown in FIG. 4, determines that the SEL is the check information that should be referred to, and acquires the SEL for the server in which the failure has occurred. The implementation determination module 153 then determines whether or not the SEL acquired by the check information acquisition module 152 includes "Reboot event".

If the SEL includes "Reboot event", indicating that the server has rebooted, and there is a possibility of automatic recovery of the server after the rebooting is complete. In this case, the implementation determination module 153 determines that autohealing is not necessary. On the other hand, if the SEL does not include "Reboot event", indicating that the server has not rebooted and automatic recovery is not likely to have taken place even if the server is left to stand by. In this case, the implementation determination module 153 determines that autohealing is necessary.

If the implementation determination module 153 determines that autohealing needs to be implemented, the autohealing implementation instruction module 154 gives the OSS/BSS 140 and the MANO 130 an instruction to implement autohealing.

After receiving the instruction to implement autohealing, the OSS/BSS 140 and the MANO 130 recover VNFs by moving them to or recreating them on a normal server.

Note that the configuration of the functional blocks of the network management unit 150 shown in FIG. 3 is an example. A plurality of functional blocks may alternatively constitute one functional block, or any one of the functional blocks may be divided into multiple functional blocks.

A plurality of functions of the network management unit 150 may also be divided into functions external to the OSS/BSS 140 and the MANO 130, internal functions of the OSS/BSS 140, and internal functions of the MANO 130 in the network management system shown in FIG. 2.

Further, the implementation condition list 400 in FIG. 4 only shows the case where the check information is an SEL and the value is "Reboot event", but the check information and the value are not limited thereto.

Figure 5:
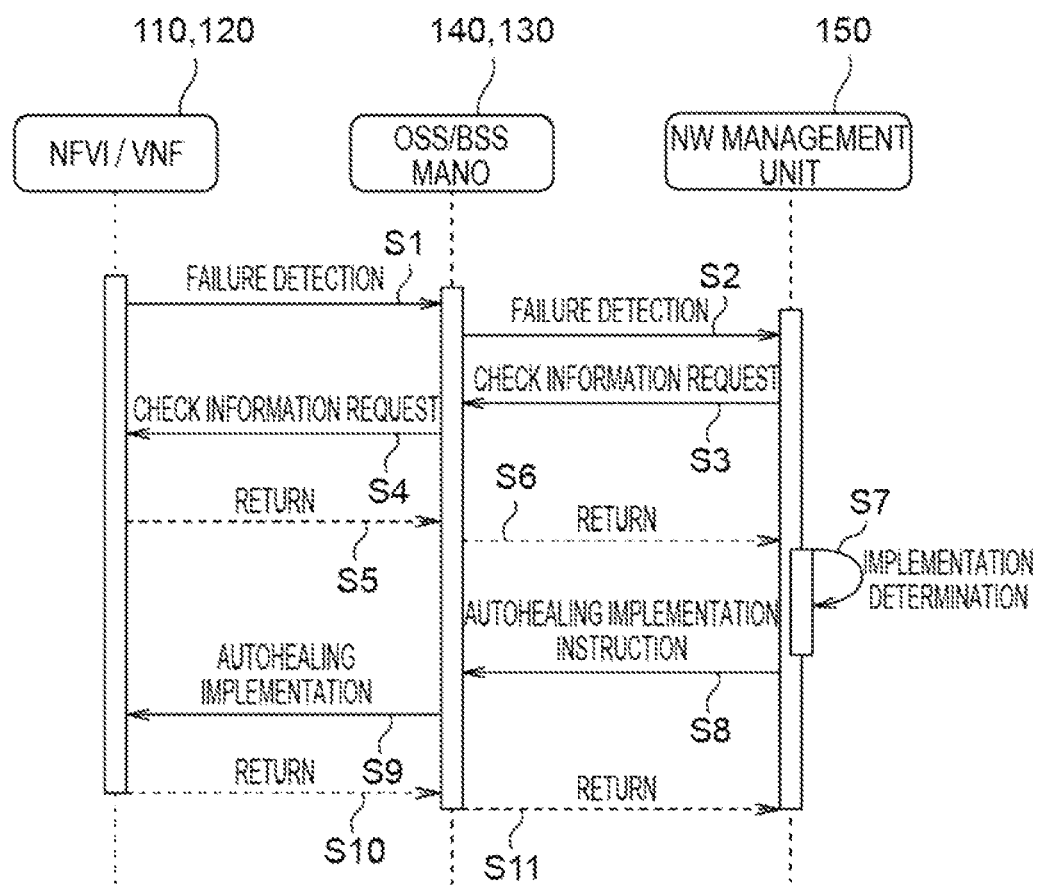
FIG. 5 shows an example of a list of autohealing implementation conditions.

FIG. 5 is a sequence diagram showing an autohealing operation performed by the network management unit 150.

If a failure has occurred in a physical server or a virtual machine, an alert will be issued from the NFVI 110 or the VNF 120 in which the failure has occurred. In step S1, the OSS 140 and the MANO 130 receive the alert issued by the NFVI 110 or the VNF 120 and thus detect a failure. In step S2, the OSS 140 and the MANO 130 transfer the issued alert to the network management unit (NW management unit) 150.

The network management unit 150 acquires the alert, looks up in the management database 150a, and determines check information associated with the failure that has occurred. In step S3, the network management unit 150 send a request to the OSS 140 and the MANO 130 for transmitting the check information.

Then, in step S4, the OSS 140 and the MANO 130 send a request to the NFVI 110 and/or the VNF 120 for transmitting the check information, and acquire, in step S5, the check information as a response to the request. If, for example, the check information is an SEL, the NFVI 110 acquires the SEL from the target physical server in response to the check information transmission request, and transmits the acquired SEL to the OSS 140 and the MANO 130. In step S6, the OSS 140 and the MANO 130 transfer the acquired check information to the network management unit 150.

In step S7, the network management unit 150 performs autohealing implementation determination processing based on the acquired check information.

If it is determined through the implementation determination processing that autohealing needs to be implemented, in step S8, the network management unit 150 gives the OSS 140 and the MANO 130 an instruction to implement autohealing. In step S9, the OSS 140 and the MANO 130 implement autohealing.

After autohealing is complete, in step S10, a completion notification is transmitted from the NFVI 110 and the VNF 120. The OSS 140 and the MANO 130 receive the completion notification, and transfer, in step S11, the completion notification to the network management unit 150. The network management unit 150 can thus confirm that autohealing is complete.

Note that the network management unit 150 is not limited to acquiring the check information from the NFVI 110 and/or the VNF 120 via the MANO 130 and the OSS 140 as shown in FIG. 5. The network management unit 150 may alternatively acquire the check information directly from the NFVI 110 and/or the VNF 120.

If it is determined through implementation determination processing that autohealing does not need to be implemented, the network management unit 150 may also monitor the running state of the virtual machine (VNF) in which the failure has occurred, and check whether or not it is running normally, i.e., has been automatically recovered. In this case, if the virtual machine is not running normally even after a predetermined time has passed since the failure occurred, the network management unit 150 may determine that automatic recovery has not occurred, re-determine that the healing processing needs to be implemented, and give the OSS 140 and the MANO 130 an instruction to implement autohealing.

Figure 6:
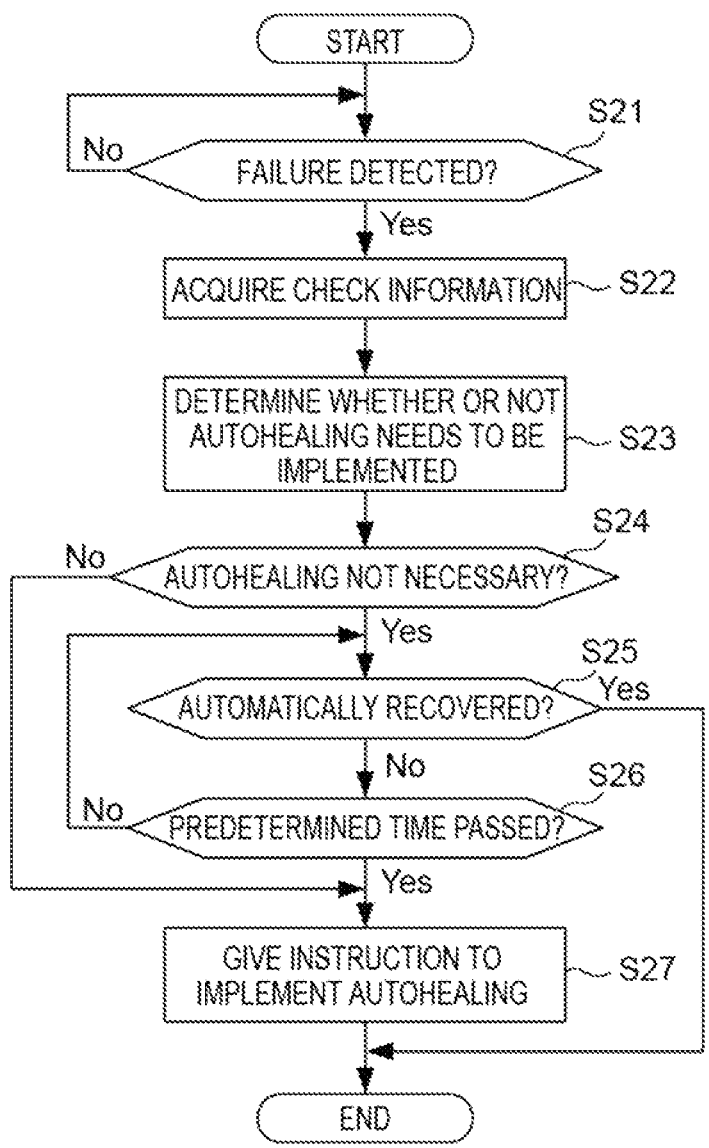
FIG. 6 is a flowchart showing the operation of the network management unit.

FIG. 6 is a flowchart showing the operation of the network management unit 150.

First, in step S21, the network management unit 150 determines whether or not a failure has been detected. Specifically, the network management unit 150 determines whether or not it has acquired an alert from the OSS 140 and the MANO 130. If the network management unit 150 has not acquired an alert, the network management unit 150 determines that it has not detected a failure and becomes standby. If the network management unit 150 has acquired an alert, the network management unit 150 determines that it has detected a failure and advances to step S22.

In step S22, the network management unit 150 acquires the check information corresponding to the failure, and advances to step S23.

In step S23, the network management unit 150 executes autohealing implementation determination processing based on the check information acquired in step S22.

If, in step S24, it is determined through the implementation determination processing in step S23 that autohealing does not need to be implemented, the network management unit 150 advances to step S25. If it is determined that autohealing needs to be implemented, the network management unit 150 advances to step S27.

In step S25, the network management unit 150 checks the running state of the virtual machine in which the failure has occurred, and determines whether or not the virtual machine is running normally, i.e., the virtual machine has been automatically recovered. If it is determined that the virtual machine has been automatically recovered, the network management unit 150 ends the processing in FIG. 6. If it is determined that the virtual machine has not been automatically recovered, the network management unit 150 advances to step S26.

In step S26, the network management unit 150 determines whether or not a predetermined time has passed since the failure occurred. Here, the predetermined time is set to be the same as or longer than the time required for the virtual machine to be automatically recovered after a failure occurs. For example, the predetermined time can be set to be the same as or longer than the time required for the physical server and the virtual machine to reboot.

If, in step S26, it is determined the predetermined period of time has not passed since the failure occurred, the network management unit 150 returns to step S25. If it is determined that the predetermined period of time has passed since the failure occurred, the network management unit 150 advances to step S27.

In step S27, the network management unit 150 gives the OSS 140 and the MANO 130 an instruction to implement autohealing.

Thus, even if it is determined that autohealing does not need to be implemented as a result of the autohealing implementation determination processing based on the alert and the check information, the network management unit 150 can re-determine that autohealing needs to be implemented and give an instruction to implement autohealing if the virtual machine has not been automatically recovered. Accordingly, the virtual machine can be appropriately prevented from remaining in an unrecovered state.

As described above, upon acquiring a notification that is issued when a failure has occurred in a physical server or a virtual machine in a network virtual environment, the network management device 150, which is the network management device of the present embodiment, determines whether or not healing processing needs to be implemented, based on the information related to the failure. If it is determined that healing processing needs to be implemented, the network management unit 150 gives the OSS 140 and the MANO 130 an instruction to implement healing processing. The network management unit 150 thus causes autohealing to be implemented.

Thus, when a failure has occurred, the network management unit 150 of the present embodiment determines whether or not autohealing needs to be implemented, based on the information related to the failure, and autohealing is implemented only when it is determined that autohealing needs to be implemented. Accordingly, unnecessary implementation of autohealing can be prevented in the case of an event in which automatic recovery occurs without autohealing.

If autohealing is implemented, it is necessary to perform human operations as post-processing, such as problem analysis for the server or the virtual machine in which the failure has occurred, replacement of the server in which the failure has occurred, and migration of the virtual machine back to the normal server after the replacement. For this reason, where autohealing that is actually unnecessary is implemented, unnecessary human operations will be carried out at extra operational costs (human labour, time cost etc.).

In the present embodiment, unnecessary implementation of autohealing can be prevented as described above, thereby suppressing the aforementioned operational costs.

There are cases where the physical server and the virtual machine can be automatically recovered by rebooting, depending on the content of the failure, as mentioned above. For this reason, if it is determined that the physical server has rebooted after the failure occurred, the network management unit 150 can determine that autohealing does not need to be implemented.

Whether or not a reboot has occurred can be checked based on the state information regarding the physical server. Here, the state information may be a system event log, for example. The network management unit 150 can quickly ascertain that a reboot has occurred by referring to the system event log, and can quickly determine whether or not autohealing needs to be implemented.

Note that the determination as to whether or not autohealing needs to be implemented is not limited to the above-described embodiment.

For example, if the failure that occurred is a physical failure, the network management unit 150 may determine that autohealing needs to be implemented. If the failure that occurred is a logical failure that will be resolved by rebooting, the network management unit 150 may determine that autohealing does not need to be implemented.

Furthermore, if the failure that occurred is a failure that occurred due to communication timing, the network management unit 150 may determine that autohealing does not need to be implemented. If the failure that occurred is a kernel panic, the network management unit 150 may determine that autohealing does not need to be implemented. If the failure that occurred is a bus error between an FPGA and a host, the network management unit 150 may determine that autohealing does not need to be implemented.

Thus, the network management unit 150 may determine whether or not autohealing needs to be implemented, based on the content of the failure. In this case as well, whether or not autohealing needs to be implemented can be appropriately determined, and unnecessary implementation of autohealing can be prevented.

In this case, the network management unit 150 may determine the content of the failure based on the alert that is issued when a failure has occurred and then determine whether or not autohealing needs to be implemented as mentioned above. However, if the content of the failure cannot be determined based only on the alert, the network management unit 150 may also acquire, as additional check information, the information that enables determination as to whether or not autohealing needs to be implemented, in addition to the alert, and make the above implementation determination based on the check information. The check information in this case may be an SEL, which is a type of state information regarding a physical server, or may be any other information related to the failure.

As described above, in the present embodiment, whether or not autohealing needs to be implemented is determined when a failure has occurred in a physical server or a virtual machine. Autohealing will be implemented only if it is determined that autohealing needs to be implemented. Therefore, operational costs in case of a failure in a virtual environment can be reduced.

The network management device according to the present embodiment may be implemented on any of the general-purpose servers that constitute a backhaul network, a core network, and the like of the mobile network 100. Note that the network management device may alternatively be implemented on a dedicated server. In addition, the network management device may be implemented on one or more computer(s).

Figure 7:
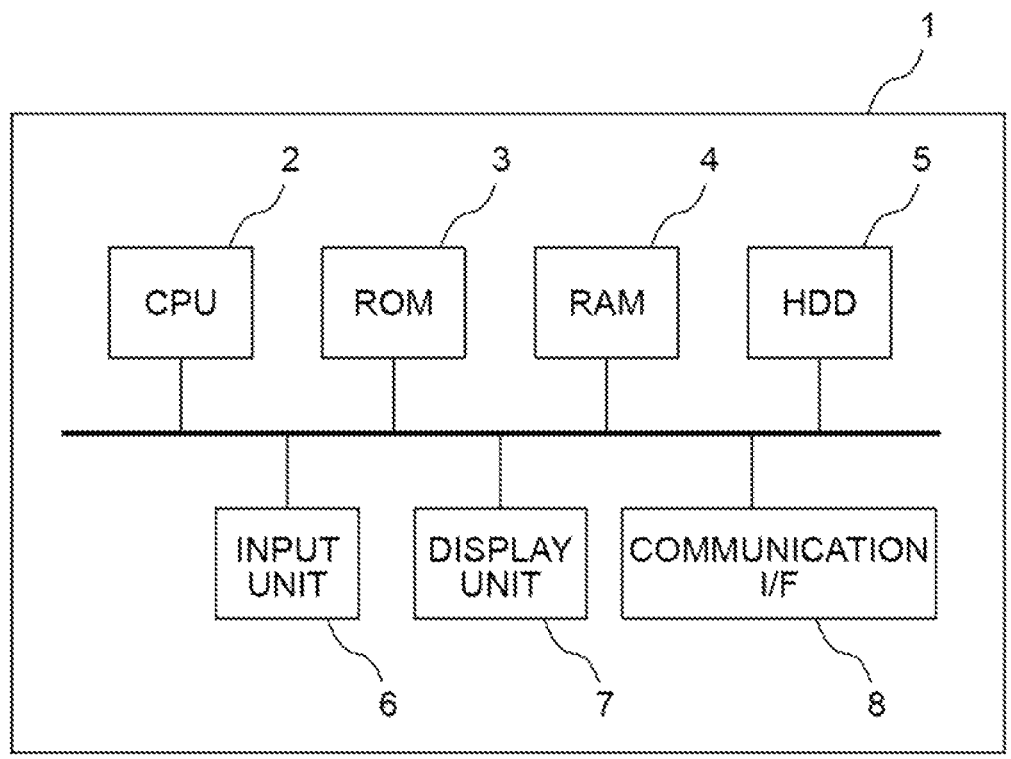
FIG. 7 is a block diagram showing an example of a hardware configuration of the network management device.

If the network management device is implemented on a single computer, a network management device 1 can include a CPU 2, a ROM 3, a RAM 4, an HDD 5, an input unit (keyboard, pointing device etc.) 6, a display unit (monitor etc.) 7, a communication I/F 8, and so on, as shown in FIG. 7. The network management device 1 may also include an external memory.

The CPU 2 is constituted by one or more processors and comprehensively controls the operation of the network management device 1. Functions of at least some of the elements of the network management unit 150 shown in FIG. 3 can be realized by the CPU 2 executing a program. Note that this program may be stored in a nonvolatile memory such as the ROM 3 or the HDD 5, or may be stored in an external memory such as a removable storage medium (not shown).

However, at least some of the elements of the network management unit 150 shown in FIG. 3 may operate as dedicated hardware. In this case, the dedicated hardware operates under control of the CPU 2.

As for functions realized by hardware, a dedicated circuit may be automatically generated on an FPGA through a program for realizing the functions of the functional modules, by using a predetermined compiler, for example. Alternatively, a gate array circuit may be formed in the same manner as an FPGA, and may be realized as hardware. Further, functions may also be realized by an ASIC (Application Specific Integrated Circuit).

According to an embodiment of the present disclosure, it may include a computer-readable storage medium that stores a program. Here, the program includes commands for causing the network management device 1 to execute at least one of the aforementioned methods when the program is executed by the CPU 2 (at least one of the one or more processors) of the network management device 1.

Note that although a specific embodiment has been described above, this embodiment is merely an example, and is not intended to limit the scope of the present disclosure. The device and method described in the present specification can be embodied in modes other than the above modes. Portions of the above embodiment can also be omitted, replaced, and modified as appropriate, without departing from the scope of the present disclosure. Modes resulting from such omission, replacement, and modification are included in the scope of the claims and the equivalents thereof, and encompassed in the technical scope of the present disclosure.

EMBODIMENTS OF PRESENT DISCLOSURE

The present disclosure includes the following embodiments.

[1] A network management device including: one or more processors, at least one of the one or more processors executing: acquisition processing of acquiring notification information that is issued in response to a failure occurring in a physical server or a virtual machine constructed in the physical server in a network virtual environment: determination processing of determining, in a case where the notification information is acquired, whether or not healing processing of recreating the virtual machine in which the failure has occurred needs to be implemented, based on information related to the failure; and implementation processing of automatically implementing the healing processing in a case where it is determined that the healing processing needs to be implemented.

[2] The network management device according to [1], wherein in the determination processing, state information regarding the physical server on which the virtual machine in which the failure has occurred is constructed is acquired as the information related to the failure, and whether or not the healing processing needs to be implemented is determined based on the state information.

[3] The network management device according to [2], wherein the state information is system event log information.

[4] The network management device according to [2] or [3], wherein in the determination processing, it is determined that the healing processing does not need to be implemented in a case where it is determined based on the state information that the physical server has rebooted after the failure occurred.

[5] The network management device according to any one of [1] to [4], wherein in the determination processing, it is determined that the healing processing needs to be implemented in a case where the failure is a physical failure, and it is determined that the healing processing does not need to be implemented in a case where the failure is a logical failure that is resolvable by a reboot.

[6] The network management device according to any one of [1] to [5], wherein in the determination processing, it is determined that the healing processing does not need to be implemented in a case where the failure is a failure that has occurred due to communication timing.

[7] The network management device according to any one of [1] to [6], wherein in the determination processing, it is determined that the healing processing does not need to be implemented in a case where the failure is a kernel panic.

[8] The network management device according to any one of [1] to [7], wherein in the determination processing, it is determined that the healing processing does not need to be implemented in a case where the failure is a bus error between a field programmable gate array (FPGA) and a host.

[9] The network management device according to any one of [1] to [8], wherein in the determination processing, a running state of the virtual machine in which the failure has occurred is monitored in a case where it is determined that the healing processing does not need to be implemented, and it will be re-determined that the healing processing needs to be implemented in a case where the virtual machine does not run normally even after a predetermined period of time has passed since the failure occurred.

[10] A network management method including: acquiring notification information that is issued in response to a failure occurring in a physical server or a virtual machine constructed in the physical server in a network virtual environment; determining, if the notification information is acquired, whether or not healing processing of recreating the virtual machine in which the failure has occurred needs to be implemented, based on information related to the failure; and automatically implementing the healing processing in a case where it is determined that the healing processing needs to be implemented.

[11] A network management system including: one or more processors, at least one of the one or more processors executing: acquisition processing of acquiring notification information that is issued in response to a failure occurring in a physical server or a virtual machine constructed in the physical server in a network virtual environment; determination processing of determining, in a case where the notification information is acquired, whether or not healing processing of recreating the virtual machine in which the failure has occurred needs to be implemented, based on information related to the failure; and implementation processing of automatically implementing the healing processing in a case where it is determined that the healing processing needs to be implemented.

REFERENCE NUMERALS AND SYMBOLS

11: Base station, 12: Edge data center, 13: Regional data center, 14: Central data center, 100: Mobile network, 110: NFVI, 120: VNF, 130: MANO, 131: NFVO, 132: VNFM, 133: VIM, 140: OSS/BSS, 150: Network management unit, 150a: Management database, 151: Alert acquisition module, 152: Check information acquisition module, 153: Implementation determination module, 154: Autohealing implementation instruction module

The invention claimed is:

1. A network management device comprising:
one or more processors,
at least one of the one or more processors executing:
acquisition processing of acquiring notification information that is issued in response to a failure occurring in a physical server or a virtual machine constructed in the physical server in a network virtual environment;
determination processing of determining, in a case where the notification information is acquired, whether or not healing processing of recreating the virtual machine in which the failure has occurred needs to be implemented, based on information related to the failure, wherein in the determination processing,
a running state of t e virtual machine in which the failure has occurred is monitored in a case where it is determined that the healing processing does not need to be implemented, and
it will be re-determined that the healing processing needs to be implemented in a case where the virtual machine does not run normally even after a predetermined period of time has passed since the failure occurred; and
implementation processing of automatically implementing the healing processing in a case where it is determined that the healing processing needs to be implemented.

2. The network management device according to claim 1, wherein in the determination processing, state information regarding the physical server on which the virtual machine in which the failure has occurred is constructed is acquired as the information related to the failure, and whether or not the healing processing needs to be implemented is determined based on the state information.

3. The network management device according to claim 2, wherein the state information is system event log information.

4. The network management device according to claim 2, wherein in the determination processing, it is determined that the healing processing does not need to be implemented in a case where it is determined based on the state information that the physical server has rebooted after the failure occurred.

5. The network management device according to claim 1, wherein in the determination processing, it is determined that the healing processing needs to be implemented in a case where the failure is a physical failure, and it is determined that the healing processing does not need to be implemented in a case where the failure is a logical failure that is resolvable by a reboot.

6. The network management device according to claim 1, wherein in the determination processing, it is determined that the healing processing does not need to be implemented in a case where the failure is a failure that has occurred due to communication timing.

7. The network management device according to claim 1, wherein in the determination processing, it is determined that the healing processing does not need to be implemented in a case where the failure is a kernel panic.

8. The network management device according to claim 1, wherein in the determination processing, it is determined that the healing processing does not need to be implemented in a case where the failure is a bus error between a field programmable gate array (FPGA) and a host.

9. A network management method comprising:
acquiring notification information that is issued in response to a failure occurring in a physical server or a virtual machine constructed in the physical server in a network virtual environment;

determining, in a case where the notification information is acquired, whether or not healing processing of recreating the virtual machine in which the failure has occurred needs to be implemented, based on information related to the failure, wherein in the determining,
- a running state of the virtual machine in which the failure has occurred is monitored in a case where it is determined that the healing processing does not need to be implemented, and
- it will be re-determined that the healing processing needs to be implemented in a case where the virtual ma chine does not run normal even after a predetermined period of time has assed since the failure occurred; and automatically implementing the healing processing in a case where it is determined that the healing processing needs to be implemented.

10. A network management system comprising:

one or more memories configured to store computer program codes; and one or more processors configured to operate as instructed by the computer program code the computer program code including:

acquisition code configured to cause the one or more processors to perform acquisition processing of acquiring notification information that is issued in response to a failure occurring in a physical server or a virtual machine constructed in the physical server in a network virtual environment;

determination code configured to cause the one or more processors to perform determination processing of determining, in a case where the notification information is acquired, whether or not healing processing of recreating the virtual machine in which the failure has occurred needs to be implemented, based on information related to the failure, wherein in the determination processing, a running state of the virtual machine in which the failure has occurred is monitored in a case where it is determined that the healing processing does not need to be implemented, and it will be re-determined that the healing processing needs to be implemented in a case where the virtual machine does not run normally even after a predetermined period of time has passed since the failure occurred; and implementation code configured to cause the one or more processors to perform implementation processing of automatically implementing the healing processing in a case where it is determined that the healing processing needs to be implemented.

\* \* \* \* \*